United States Patent

Hayami et al.

[11] 4,314,058
[45] Feb. 2, 1982

[54] INDOLINS STYRYL-LIKE COMPOUNDS

[75] Inventors: Masaaki Hayami; Seiko Torikoshi, both of Okayama, Japan

[73] Assignee: Matsushita Electric Industrial Co., Ltd., Osaka Pref., Japan

[21] Appl. No.: 119,147

[22] Filed: Feb. 6, 1980

Related U.S. Application Data

[63] Continuation of Ser. No. 921,095, May 2, 1978, abandoned, which is a continuation of Ser. No. 734,626, Oct. 21, 1976, Pat. No. 4,147,862, which is a continuation-in-part of Ser. No. 611,834, Sep. 9, 1975, abandoned.

[30] Foreign Application Priority Data

Sep. 18, 1974 [JP] Japan .................. 49/108090

[51] Int. Cl.³ .......................... C07D 498/04
[52] U.S. Cl. .................. 542/455; 260/243.3; 260/244.4; 260/245.5; 260/245.6; 260/245.7; 542/415; 542/401; 542/432; 542/434; 544/32; 544/89; 544/242; 544/333; 546/270; 548/121; 548/159; 548/150; 548/217
[58] Field of Search ............ 260/243.3, 244.4, 245.6, 260/245.7, 245.5; 544/32, 89, 242, 333; 546/270; 548/121, 159, 150, 217; 542/415, 401, 432, 434, 455

[56] References Cited

U.S. PATENT DOCUMENTS

| | | | |
|---|---|---|---|
| 3,860,583 | 1/1975 | Schmitt | 548/217 |
| 3,904,613 | 9/1975 | Schmitt | 548/217 |
| 3,975,379 | 8/1976 | Schmitt | 542/457 |

OTHER PUBLICATIONS

Chemischerr Informationsdienst 1974, #5-262.

Primary Examiner—Arthur P. Demers
Attorney, Agent, or Firm—Cushman, Darby & Cushman

[57] ABSTRACT

This invention relates to color-changing stryl-like compounds and the preparing of the same. A compound according to the present invention has, as its principal ring, an indoline ring of 2nd position, and has, at stimulation reversible or irreversible change(s) between a closed ring structre of a non-plane molecular structure indicated by the following chemical formula(1) showing white or pale color, and an open ring structure of a plane molecular structure indicated by the following chemical formula(2) showing vivid visible color:

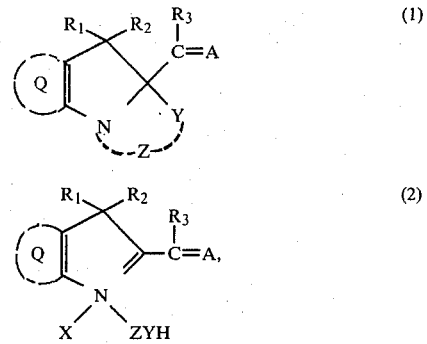

Wherein Q represents benzene ring with or without substituted radicals and/or condensed ring(s); $R_1$ and $R_2$ represent lower alkyl radicals hydroxyalkyl radicals or alkoxyalkyl radicals of the same or different kinds,; $R_3$ represents hydrogen, alkyl radical, alkoxy radical, halogen, nitrile radical, aromatic radical or phenoxy radical; Y represents oxygen (O) or sulfer (S); Z represents alkylene radical of carbon number of 2 to 4 with or without alkyl substitution radical(s) necessary to form a ring structure together with

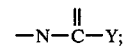

A represents a condensation reaction residue of an aromatic aldehyde, heterocyclic aldehyde, aromatic nitroso compound, or heterocyclic nitroso compound. And X represents an anion.

40 Claims, No Drawings

INDOLINS STYRYL-LIKE COMPOUNDS

This is a continuation application [37 CFR 1.60] of Ser. No. 921,095, filed May 2, 1978, now abandoned which in turn is a continuation application [37 CFR 1.60] of Ser. No. 734,626, filed Oct. 21, 1976, now U.S. Pat. No. 4,147,862, said Ser. No. 734,626 being in turn a continuation-in-part of Ser. No. 611,834, filed Sept. 9, 1975, now abandoned.

BACKGROUND OF THE INVENTION

Spiropyran compounds have been well known as substances which changes, lose or restore their colors at stimulation by light or heat. However, the abovementioned known substances have such shortcomings as necessitating a great amount of energy and not being sufficiently stable.

SUMMARY OF THE INVENTION

This invention purports to provide novel color-changing compounds which are stable and require less energy to change, lose or restore their colors, and the preparing methods of them.

DETAILED DESCRIPTION

The color changing substances of the present invention are compounds of the below mentioned chemical formula:

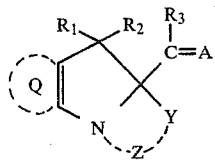
(1)

Wherein and hereinafter in this invention, Q represents benzene ring with or without substituted radical(s) and/or condensed ring(s); $R_1$ and $R_2$ represent lower alkyl radicals hydroxyalkyl radicals or alkoxyalkyl radicals of the same or different kinds,; $R_3$ represents hydrogen, alkyl radical, alkoxy radical, halogen, nitrile radical, aromatic radical or phenoxy radical; Y represents oxygen (O) or sulfur (S); Z represents alkylene radical of carbon number of 2 to 4 with or without alkyl substitution radical(s) necessary to form a ring structure together with

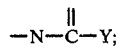

A represents a condensation reaction residue of an aromatic aldehyde, heterocyclic aldehyde, aromatic nitroso compound, or heterocyclic nitroso compound.

A first method of preparing the abovementioned compound is characterized in that an indoline derivative having the following chemical formula:

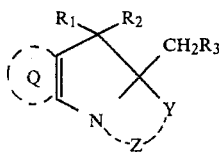
(3)

is reacted with one substance selected from the group consisting of aromatic aldehydes, heterocyclic aldehydes, aromatic nitroso compounds and heterocyclic nitroso compounds, to form styryl-like compounds represented by the following chemical formula:

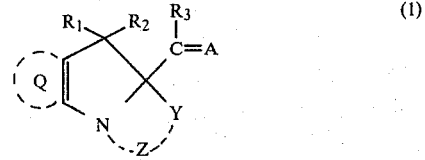
(1)

A second method of preparing the abovementioned compound is characterized in that a styryl dye having the following chemical formula:

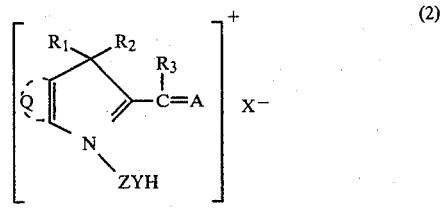
(2)

is reacted with an alkali to form the styryl-like compound represented by the chemical formula(1), wherein X represents an anion.

This invention was made through a finding that a 2nd-position methyl radical or methylene radical of an indoline derivative represented by the chemical formula(3) is chemically active and makes dehydrating condensation reaction with aromatic aldehyde, heterocyclic aldehyde, aromatic nitroso compound or heterocyclic nitroso compound to form condensation product indicated by the chemical formula(1).

The abovementioned reaction is obtainable by either of the following methods:

(1) The abovementioned starting materials (namely, compound of the chemical formula(3) and an aldehyde or a nitroso compound) are heated to melt in the presence or in absence of an alkali.

(2) The abovementioned starting materials are heated to react in a nonpolar solvent.

(3) The abovementioned starting materials are heated to react in an aprotonic type polar solvent.

(4) The abovementioned starting materials are reacted in the presence of an alkali in a protonic type solvent.

(5) The abovementioned starting materials are reacted in the presence of an alkali, in a nonpolar solvent, an aprotonic type polar solvent or a mixture thereof.

(6) The abovementioned starting materials are reacted in a protonic type solvent.

Also, the invention was made through another finding that the abovementioned chemical compound of the chemical formula(1) can be prepared also by treating the styryl compound of the chemical formula(2) with an alkali.

When the abovementioned starting materials (i.e., the compound of formula(3) and the aldehyde or nitroso compound) are treated in the absence of alkali, in a protonic type solvent, or in a mixed solvent consisting of a protonic type solvent and at least one selected from the group of nonpolar solvent and aprotonic type polar solvent, then the following two cases occur:

(a) Intended compound represented by the chemical formula(1) is produced, and (b) A mixture of the intended compound represented by the chemical formula(1) and by-product (dye) represented by the chemical formula(2) is produced. From the mixture, the respective compounds represented by the chemical formulas(1) and (2) can be easily separated from each other by treating the mixture with a fractionating solvent such as ether, benzene, ethyl acetate, n-hexane or cyclohexane.

When the abovementioned indoline-derivative of chemical formula(3) and the abovementioned aldehyde or nitroso compound are made to react with each other in the presence of acetic anhydride, acetic acid or mixture thereof, then styryl dye of indolenium type of chemical formula(2) is obtainable. In such reaction by adding an alkali in the mixture of the starting materials or by dissolving once separated coarse product in a suitable solvent and subsequently adding an alkali thereto, and by further heating the mixture, the aimed product indicated by the chemical formula(1) is prepared.

When the aimed product of the formula(1) and the styryl dyes of indolenium type are produced, in a form of a mixture thereof, by the aforementioned reaction between the indoline-derivative and the abovementioned aldehyde or nitroso compound in a protonic type solvent or a mixed solvent containing thereof in the absence of alkali as abovementioned, then the aimed product is obtainable by adding an alkali into the abovementioned reacting system or a solution made by dissolving the separated mixture in a suitable solvent and subsequently heating the reacting system or the solution.

For the abovementioned alkali, many organic or inorganic alkalis can be used.

For the organic alkali, triethylamine, piperidine or morpholine is preferable. For the inorganic alkali, alkali carbonate or ammonia is preferable.

One example of preparation of the indoline derivative of the chemical formula(3) is as follows:

A 2-alkyl-indolenine derivative represented by the following formula

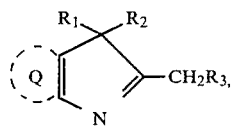
(4)

and a quaternary-salts agent represented by XZYH, as the starting materials, are heat-reacted. And the resultant product represented by the following formula(5) is treated in an aqueous solution or an organic solvent solution of inorganic alkali such as caustic soda, sodium carbonate or ammonia, or of organic alkali such as triethylamine, piperidine or morpholine.

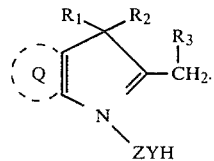
(5)

Then, the separated oil-like substance or crystal is further extracted by means of non-aqueous organic solvent. Then, the product is dehydrated, and the solvent is evaporated, and the residue product is crystallized through vacuum distillation or by means of nonpolar organic solvent.

Further, through another vacuum distillation and crystallization or precipitation, the indoline derivative represented by the chemical formula(3) is obtained.

For the starting materials, namely, the indoline derivative of the formula(3) and an aldehyde or a nitroso compound, any indoline derivative, any aldehyde or any nitroso compound can be employed provided that these starting materials enable dehydrating condensation reaction between methyl radical or methylene radical of 2nd-position of the indoline derivative and aldehyde radical or nitroso radical of the aldehyde or nitroso compound. For instance, for benzene-ring substitution radical to constitute the indolenine-derivative of the formula(4), alkyl radical, substituted alkyl radical, alkoxy radical, aryloxy radical, amino, substituted amino, aryl, substituted aryl, alkoxy carbonyl radical, carboxy radical, carboxy alkyl radical, nitro radical, cyano radical or halogen can be employed.

On the other hand, the color-type styryl dyes represented by formula(2) are also obtainable by condensation-reaction of the abovementioned product of formula(5) and aromatic aldehydes, heterocyclic aldehydes or nitroso compounds represented by Ar—(CH=CH)$_n$—CHO or Ar—NO (wherein Ar represents aromatic nucleus or heterocyclic nucleus, n indicates 0 or 1).

For preferable indolenine derivative for the present invention any of the following can be employed: 2,3,3-trimethyl-indolenine, 2,3,3,5-tetramethyl-indolenine, 2,3,3-trimethyl-4-methoxy-indolenine, 2,3,3-trimethyl-5-methoxy-indolenine, 2,3,3-trimethyl-6-methoxy-indolenine, 2,3,3-trimethyl-7-methoxy-indolenine, 2,3,3-trimethyl-5-amino-indolenine, 2,3,3-trimethyl-5-acetoamino-indolenine, 2,3,3-trimethyl-5-benzoylamino-indolenine, 2,3,3-trimethyl-5-dimethylamino-indolenine, 2,3,3-trimethyl-5-ethylamino-indolenine, 2,3,3-trimethyl-5-nitro-indolenine, 2,3,3-trimethyl-6-nitro-indolenine, 2,3,3-trimethyl-5-iodo-indolenine, 2,3,3-trimethyl-7-bromo-indolenine, 2,3,3-trimethyl-5-ethoxycarbonyl-indolenine, 2,3,3-trimethyl-5-phenoxy-indolenine, 2,3,3-trimethyl-5-anilino-indolenine, 2,3,3-trimethyl-5-carboxy-indolenine, 2,3,3-trimethyl-5-cyano-indolenine, 2,3,3-trimethyl-5-phenyl-indolenine, 2,3,3-trimethyl-4,5-benzo-indolenine, 2,3,3-trimethyl-4,5-dimethoxy-indolenine, 2,3,3,5,7-pentamethyl-indolenine, 2,3,3-trimethyl-5,6-dimethoxy-indolenine, 2,3,3,7-tetramethyl-5-nitro-indolenine, 2-methyl-3,3-diethyl-indolenine, 2,3-dimethyl-3-ethyl-indolenine, 2,5-dimethyl-3,3-diethyl-indolenine, 2,3-dimethyl-3-hydroxyethyl-indolenine, 2,3-dimethyl-3-ethoxymethyl-indolenine and 2,3-dimethyl-3-phenoxyethyl-indolenine. Besides, polycyclic condensation indolenine such as naphto-indolenine can be employed, too.

For preferable quaternary salts agent for the present invention, any of the following can be employed: ethylene bromohydrin, ethylen chlorohydrin, trimethylene chlorohydrin trimethylene bromohydrin, tetramethylen chlorohydrin, tetramethylene bromohydrin, 1-chloro-2-propanol, 2-chloro-1-propanol, 2-chloroethyl mercaptan and 3-chloropropyl mercaptan.

It is empirically found that any of the following aromatic aldehydes can be used as the aforementioned aromatic aldehyde: benzaldehyde, p-acetaminobenzaldehyde, p-bromobenzaldehyde, m-bromobenzaldehyde, o-bromozenzaldehyde, p-dimethylaminobenzaldehyde, p-diethylaminobenzaldehyde, p-dibutylamino-benzaldehyde, o-chlorobenzaldehyde, p-chlorobenzaldehyde, p-anisaldehyde, o-anisaldehyde, p-tolu-aldehyde, m-tolu-aldehyde, o-tolu-aldehyde, o-ethoxybenzaldehyde, p-ethoxybenzaldehyde, p-fluorobenzaldehyde, o-fluorobenzaldehyde, p-nitrobenzaldehyde, m-nitro-benzaldehyde, o-nitro-benzaldehyde, p-cyanobenzaldehyde, o-cyanobenzaldehyde, 2,4-dichlorobenzaldehyde, 2,6-dichlorobenzaldehyde, 2,4-dichlorobenzaldehyde, 3,5-dichlorobenzaldehyde, 2,4-dimethoxybenzaldehyde, 2,5-dimethoxybenzaldehyde, 3,4-dimethoxybenzaldehyde, 3,5-dimethoxybenzaldehyde, 2,4-dimethylbenzaldehyde, 2,5-dimethylbenzaldehyde, 3,4-dimethylbenzaldehyde, 3,5-dimethylbenzaldehyde, veratraldehyde(3,4-dimethoxy benzaldehyde), 4-isopropylbenzaldehyde, o-(2-chloroethyl) benzaldehyde, 2,4,6-trimethylbenzaldehyde, 2,4,6-triethoxybenzaldehyde, 3,4-dimethyl-p-anisaldehyde, 2,5-dimethyl-p-anisaldehyde, 2-chloro-5-nitrobenzaldehyde, 2-chloro-6-nitrobenzaldehyde, 2-chloro-3-nitrobenzaldehyde, 5-chloro-2-nitrobenzaldehyde, vanillin, o-vanillin, isovanillin, 5-bromo-vanillin, 2-chloro-4-dimethylaminobenzaldehyde, 2-chloro-6-fluorobenzaldehyde, 5-bromo-veratraldehyde, 6-bromo-veratraldehyde, 5-bromo-2-methoxy-benzaldehyde, 1-naphto-aldehyde, 2-naphtoaldehyde, p-dimethylamino-cinnamaldehyde, p-diethylamino-cinnamaldehyde, p-nitrocinnamaldehyde, o-nitro-cinnamaldehyde, α-chloro-cinnamaldehyde, 2-chloro-cinnamaldehyde, 9-anthraldehyde, 10-chloro-9-anthraldehyde, 9-phenanthrene-carboxyaldehyde and fluorencarboxyaldehyde.

It is empirically found that any of the following aromatic nitroso compounds can be used as the aforementioned aromatic nitroso compound: p-dimethylaminonitrosobenzene, p-diethylaminotrosobenzene, p-methylnitrosobenzene(p-nitrosotoluene) p-nitro-nitrosobenzene, o-nitro-nitrosobenzene, 3-nitroso-2-nitrotoluene.

It is empirically found that any of the following heterocyclic aldehydes can be used as the aforementioned heterocyclic aldehyde: furfural, 5-methylfurfural, 5-bromofurfural, 4-isopropylfurfural, 2-thiophene-carboxaldehyde, 5-methyl-thiophene-carboxaldehyde, 3-methoxybenzothiocitric-2-carboxaldehyde, 2-pyridinecarboxaldehyde, 3-pyridinecarboxaldehyde, 1-methylindole-3-carboxaldehyde, 1-methyl-2-phenylindole-3-carboxaldehyde, N-methyl-carbazole-2-carboxaldehyde, N-ethyl -7-bromo-carbazole-2-carboxaldehyde, N-(n-octyl)-7-nitro-carbazole-2-carboxaldehyde, benzofuran-2-carboxaldehyde, dibenzofuran-2-carboxaldehyde, pyrrole-2-aldehyde, N-methylpyrrole-2-aldehyde, N-phenylpyrrole-2-aldehyde, 3-methylpyrrole-2-aldehyde, 2-ethyl-pyrrole-5-aldehyde, benzothiazole-2-aldehyde, 6-methylbenzothiazole-2-aldehyde, 6-chlorobenzothiazole-2-aldehyde, 5-chlorobenzothiazole-2-aldehyde, 6-methoxybenzothiazole-2-aldehyde, 5,6-dichlorobenzothiazole-2-aldehyde, benzoselenazole-2-aldehyde, 6-methoxybenzoselenazole-2-aldehyde, 4-methylthiazole-2-aldehyde, 3,3-dimethyl-indolenine-2-aldehyde, 2,4-dimethylpyrrole-2-aldehyde, 4,6-dichloro-pyrimidine-5-carboxaldehyde, 2-formyl-4,6-dimethylpyrimidine, quinoline-2-aldehyde, acridine-10-aldehyde, 2,4-diphenyl-5,6,7-hexahydrobenzopyran-8-carboxaldehyde and 2,4-diphenyl-6-methyl-5,6,7-pentahydrobenzopyran-8-carboxaldehyde, N-ethyl-benzothiazole-2-pentamethine-ω-aldehyde, 3-ethyl-2-formlymethylene-2(3H)thiazolyliden, 1,3,3-trimethyl-2formylmethylene-2(3H)indolyliden, furan-2-dimethine-β-aldehyde.

It is empirically found that any of the following heterocyclic nitroso compounds can be used for the aforementioned heterocyclic nitroso compounds: 3-nitrosoindole, 2-methyl-3-nitrosoindole and 3-nitrosophenylindole.

In each of the styryl-like compounds produced according to the present invention, each closed ring exists only on the side of its indoline ring, and on the right side of methine-chain of 2nd-position carbon, the structure is not on the same plane with the left side. Namely, the compounds have structures bent at the methine-chain. Therefore, the lacalized electrons become abundant in comparison with ordinary indoline dyes wherein the electrons are not localized. Consequently, in the compounds produced by the present invention, maximum absorptions can not reach the wavelengths in visual range, and the maximum absorption lie in ultraviolet ray range, showing white, transparent or pale yellowish appearance. The abovementioned compounds change into a plane structure of indolenium type of formula(2) when their N-Z-Y rings open.

By selecting the component members, namely indoline derivative and aldehyde or nitroso compound, various dyes having maximum absorptions in near ultraviolet range, visible range or in near infrared range are obtainable. Also, the dyes show various maximum absorptions when dissolved in various solvents as follows:
3,3-dimethyl-2-(p-dimethylaminostyryl)-indolino-[1,2-b]-oxazoline
298 nm (in n hexane),
547 nm (in methanol),
298 nm (in n-propanol),
298 nm (in n-octyl alcohol),
547 nm (in acetic acid),
299 nm (in acetonitrile-acetic acid),
299 nm (in acetonitrile),
550 nm (in ethanol).

Others of the abovementioned compounds of the present invention show similar characteristics, wherein the compounds show prominent red-shift in methanol, ethanol or acetic acid.

Comparison between the compounds of the present invention and conventional spiropyran compounds, which comparison is used as photographic or thermal recording material, is elucidated in the following, so as to clarify advantage of the compounds of the present invention.

In the present invention, the closed ring structure is formed by the indoline ring only, while in the conventional indolino-spiropyrans, a closed ring structure exists between the indoline ring and benzen ring. This difference gives the compounds of the present invention a great advantage that an aldehyde or nitroso compound as starting material can be selected from a wide variety.

In the conventional indolino-spiropyran compound, it is necessary to select an aromatic aldehyde or a nitroso compound which has hydroxyl radical in orthoposition. However, according to the present invention, such condition is not necessary, but any kind as well as any structure of the aromatic aldehyde or nitroso compound can be used, and furthermore, heterocyclic aldehyde or heterocyclic nitroso compound also can be used.

Moreover, in the conventional indolino spiropyran compound, it is necessary that the aldehyde radical or the nitroso radical bonds to the aromatic ring. However, in the present invention such is not required, and the aldehyde radical or nitroso radical need not bond directly to the aromatic ring or the heterocyclic ring, but may bond at the end of conjugate diene bond.

The abovementioned characteristic of the present invention causes advantage in selection of materials, variety of colors of the produced dye, and other physical properties. For instance, the conventional indolino spiropyran compound has a structure that the indoline ring and the benzen ring are connected by two methine chains, and therefore, when the structure is changed to open and show visible color, the number of conjugate double-bond chains is limited, and consequently, the wavelength of maximum absorption of the compound is limited at most in the region of 550–580 nm even if a substitution radical is suitably selected. In another spiropyrans, there are such shortcomings as the purity of color at the open-ring structure is not satisfactory, or the changing to the open-ring structure takes place only in cold temperature. Even in the indolino spiropyrans which has the purest colors, the variety of colors is not satisfactory. On the contrary, the abovementioned compound of the present invention has many a variety of colors produced by various absorptions near the ultraviolet to near the infrared regions, and has an advantage of showing various colors in response to an additive such as solvent.

Also, in applications in photographic field, the styryl-like compounds of the present invention as well as the indolenium-type open-ring structure compounds of the formula(2) are useful as optic sensitizer when used together with various cyanine dyes. The compounds of the present invention can be used as non-developable masking film of erasable type of a photographic film. When contained in a film emulsion of diffusion-transfer type photographic film, the compounds of the present invention function to increase the transfer sensitivity and keep the film base clean even after repetition of the transfer process.

In the following, the present invention is elucidated by means of many examples, but the compound described in the following examples are mere representative examples, and therefore, the scope of the present invention should not be considered as limited to these examples.

Examples 1 to 15 are for the first method, namely, reacting an indoline derivative of the formula(3) and an aldehyde or a nitroso compound.

Examples 16 to 22 are for the second method, namely, treating a styryl dye of the formula(2) in an alkali.

EXAMPLE 1

3,3-dimethyl-2-(para-dimethylaminostyryl)indolino-[1,2-b]oxazoline

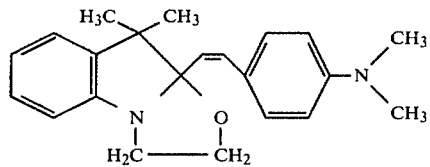

was prepared in the following way:

Thirty gram of 2,3,3-trimethyl indolenine and 25 g of ethylene bromhydrine were heated at 120° C. for 6 hrs. The resultant viscous solid was refluxed with heating in 100 ml of acetone. The resultant residue was cooled and filtered to form 38 g of 1-hydroxyethyl-2,3,3-trimethyl indoleniumbromide. Next, 10 g of 1-hydroxyethyl-2,3,3-trimethyl indoleniumbromide was mixed with sodium carbonate solution. The mixture was extracted with ethylether. The ethylether-region was separated and washed with water, and then dehydrated with anhydrous magnesium sulfate and filtered. The filtrate was evaporated to remove the ethyleter, with formation of a pale yellow oily substance. By distillating the pale yellow oily substance under reduced pressure, 2,3,3-trimethyl indolino-[1,2-b] oxazoline represented by general formula(3) was obtainable as a colorless oily substance having boiling point of 112° C./6 mmHg.

It was confirmed by means of elemental analysis and nuclear magnetic resonance spectra, data of which are shown below:

By elemental analysis, Molecular formula was:
$C_{13}H_{17}NO$, C:77.22 (theoretical value 76.85) H:8.54 (theoretical value 8.37) N:7.03 (theoretical value 6.90).

By nuclear magnetic resonance spectra (Solvent: $CDCl_3$, Reference Sample:Trimethylsilane), $\delta = 1.15$ (3H.S. 3—$CH_3$ or 2—$CH_3$),
$\delta = 1.31$ (3H.S. 3—$CH_3$ or 2—$CH_3$),
$\delta = 1.40$ (3H.S. 3—$CH_3$ or 2—$CH_3$),
$\delta = 3.34$–3.89 (4H.m. —$CH_2$—$CH_2$—),
$\delta = 6.66$ and 7.00–7.20 (3H.m. Aromatic protones), hence, Structural formula:

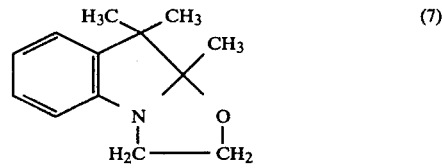

One gram of 2,3,3-trimethyl indolino[1.2-b]oxazoline and 0.75 g of para-dimethylaminobenzaldehyde were refluxed in 30 ml of absolute ethanol for 3.0 hours, and then the solvent was removed by evaporation. The residue was extracted with ethyl ether. The layer of ethyl ether (ethyl ether containing the extract) was dried with neutral drying agent such as magnesium sulfate and filtered out. The filtrate was evaporated to remove the solvent. The resultant residue was extracted by heating in n-hexane. The mixture was treated with active carbon and filtered. The filtrate was evaporated to take away the solvent. The resultant residue was treated with petroleum ether to obtain 0.35 g of the desired product, namely a very pale yellowish cream amorphous crystal, which melts at 142° C. and exhibits its maximum absorption (in n-hexane) at B 296 nm.

EXAMPLE 2

3,3-dimethyl-5-methoxy-2-(para-chlorostyryl)indolino-[1,2-b]oxazoline

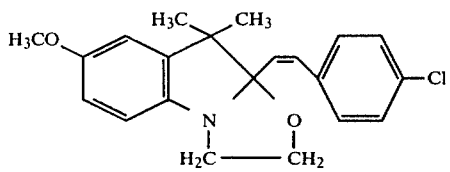

was prepared in the following way:

2,3,3-trimethyl-5-methoxy indolino[1,2-b]oxazoline 1.1 g and para-chlorobenzaldehyde 0.7 g were refluxed with boiling in 35 ml of absolute ethanol for 3.5 hours, and then the ethanol was removed by evaporation. The resultant pale yellow oily substance was washed two times with water containing a small quantity of methanol by decantation and dissolved in small quantities of methanol to be made basic with ammonia water, followed by dilution with water. The resultant cream and slightly viscous solid was broken by means of petroleum ether to crystallize. The formed crystal was extracted by heating in n-hexane. The mixing was treated with active carbon and filtered. The filtrate was evaporated to remove the solvent. The residue was cooled with ice and broken with a small amount of petroleum ether. The petroleum ether was filtered off with suction. Upon vacuum-drying the residue, the desired product, namely pale yellowish-greenish or light yellowish white powdered crystals, was obtained. The crystals have a melting point of 123° C. and exhibit their maximum obsorption (in n-hexane) at 258 nm.

EXAMPLE 3

3,3-dimethyl-5-chloro-2-(para-dimethylaminostyryl)-indolino[1,2-b]oxazoline

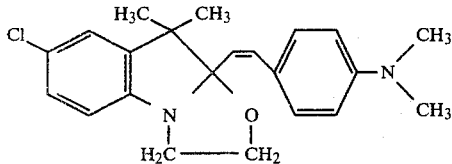
(9)

was prepared in the following way:

In 40 ml of absolute ethanol containing 0.3 ml of triethylamine, 1,2 g of 2,3,3-trimethyl-5-chloroindolino-[1,2-b]oxazoline and 0.75 g of para-dimethylaminobenzaldehyde were refluxed by heating for 2 hours, and then the ethanol was eliminated by evaporation. The resultant residue was washed two times with water by decantation, further washed well with cold water, filtered, and then extracted with ethyl ether. The mixture of residue and ethyl was treated with active carbon and filtered. The filtrate was evaporated to remove the ethyl ether. The residue was extracted by heating in the suitable amount of n-hexane. The mixture was then filtered. The filtrate was evaporated to remove the n-hexane. Upon vacuum-drying the residue, the desired product, namely pale pinkish white powdered crystals, was obtained. The crystals have a melting point of 165° to 166° C. and exhibit their maximum absorption (in n-hexane) at 299 nm.

EXAMPLE 4

3,3-dimethyl-2-(para-nitrostyryl)indolino[1,2-b]oxazoline

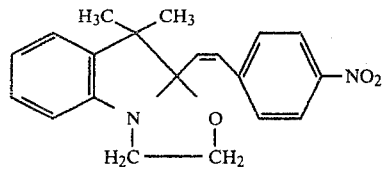
(10)

was prepared in the following way:

One gram of 2,3,3-trimethyl-indolino[1,2-b]oxazoline and 0.75 g of para-nitrobenzaldehyde was refluxed with heating in 35 ml of benzene for 2,5 hours, and then the benzene was removed by evaporation. The resultant residue was washed with ethyl ether and heated with the suitable amount of water to form a crude crystal. The methanol-insoluble residue of the crude crystal was dissolved in 5 ml of chloroform. The solution was added to 25 ml of n-hexane to precipitate the desired product, namely a bright pale yellow amorphous crystal. The crystal melts at 163° to 164° C. and exhibits its maximum absorption (in n-hexane) at 294 nm.

EXAMPLE 5

3,3,5-trimethyl-2-(para-dimethylaminostyryl)indolino-[1,2-b]oxazoline

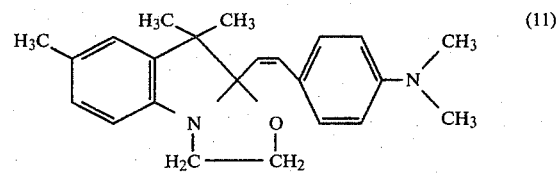
(11)

was prepared in the following way:

In 30 ml of acetonitrile, 1.1 g of 2,3,3,5-tetramethylindolino[1,2-b]oxazoline and 0.75 g of para-dimethylaminobenzaldehyde were heated on a water bath for 2 hours, and then the acetonitrile was removed by evaporation under vacuum. The resultant residue was dissolved in 30 ml of acetone. The solution was treated with active carbon and filtered. The filtrate was evaporated to remove the acetone. The residue was further dissolved in ethyl ether. The solution was treated with active carbon and filtered. The ethyl ether was removed from the filtrate by evaporation. The resulting residue was broken by means of petroleum ether. The petroleum ether was filtered off with suction. Upon vacuum-drying the residue, the desired product, namely a pale yellow white powdered crystals, was obtained. The crystals melt at 170° C. and exhibit their maximum absorption (in n-hexane) at 297 nm.

EXAMPLE 6

3,3-dimethyl-4,5-benzo-2-(para-dimethylaminostyryl)-indolino[1,2-b]oxazoline

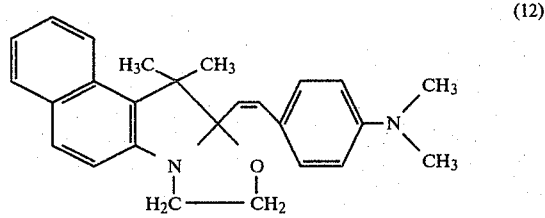
(12)

was prepared in the following way:

On a water bath, 1.28 g of 2,3,3-trimethyl-4,5-benzoindolino[1,2-b]oxazoline and 0.75 g of para-dimethylaminobenzaldehyde were subjected to a fusion reaction for 1.5 hours. The reactant was treated with active carbon in 40 ml of acetone. The region of acetone was filtered off and evaporated. The residue was cooled with the suitable amount of water to form a crystal. The crystal was filtered with suction, dried, and then extracted by heating in n-hexane. The mixture was treated with active carbon and, next the solvent was removed by evaporation. The resulting residue was braked with a small quantity of petroleum ether to form a crystal. The formed crystal was of slightly darkish cream or pale yellow amorphous one. It melts at 197° C. and exhibits its maximum absorption (in n-hexane) at 298 nm.

EXAMPLE 7

3,3-dimethyl-2-(metha-bromostyryl)indolino[1,2-b]oxazoline

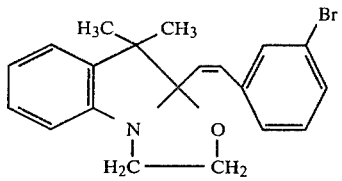

was prepared in the following way:

One gram of 2,3,3-trimethylindolino[1,2-b]oxazoline and 0.92 g of methabrombenzaldehyde were heated in 30 ml of 1,4-dioxane on a water bath for 2 hours, and then the solvent was removed by evaporation. The residue was treated with active carbon in ethyl ether. Evaporation was carried out to remove the solvent. The residue was treated with petroleum ether to form a crystal. The crystal exhibits it maximum absorption (in n-hexane) at 245 nm.

EXAMPLE 8

3,3-dimethyl-5-chloro-2-(para-methoxystyryl)indolino-[1,2-b]oxazoline

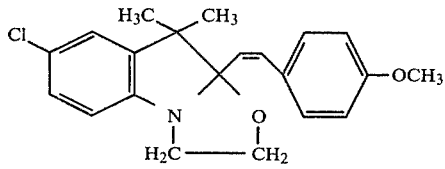

was prepared in the following way:

In 0.3 ml of trimethylamine, 1.2 g of 2,3,3-trimethyl-5-chloroindolino[1,2-b]oxazoline and 0.68 g of para-methoxybenzaldehyde were subjected to a fusion reaction on a water bath for 1.5 hours. The reactant was cooled, washed three to four times with water, and then extracted with ethyl ether. The solution was dehydrated by anhydrous sodium sulfate and filtered. The filtrate was evaporated to remove the solvent and then treated with a small amount of petroleum ether to form a crystal. The formed crystal was extracted with n-hexane, treated with active carbon, and then filtered. The residue was treated with petroleum ether, with the formation of the desired product, namely a pale cream-yellow crystal, which melts at 132° C. and exhibits its maximum absorption (in n-hexane) at 264 nm.

EXAMPLE 9

In accordance with the method of example 1 or 2, the following compound were prepared by the reaction of one of 2,3,3-triethylindolino[1,2-b]oxazoline derivatives and one of aromatic aldehydes. In parentheses at each end of compound name, its melting point (°C) (hereinafter referred to as mp), maximum absorption (nm) (hereinafter referred to as max a) which is measured in n-hexane if otherwise mentioned, and in some special case shoulder absorption (hereinafter referred to as shol a) are designated. The definition is applied to the subsequent examples:

3,3-dimethyl-6-methoxy-2-(para-dimethylaminostyryl)-indolino[1,2-b]oxazoline (mp: 128° C., max a: 298 nm), 3,3-dimethyl-2-(para-chlorostyryl)indolino[1,2-b]oxazoline (mp: 91° to 92° C., max a: 259 nm), 3,3,5-trimethyl-2-(para-chlorostyryl)[1,2-b]oxazoline (mp: 141° to 142° C., max a: 258 nm), 3,3-dimethyl-2-(para-acetylaminostyryl)indolino[1,2-b]oxazoline (mp: 197° C., max a: 280 nm), 3,3-dimethyl-2-(para-hydroxystyryl)indolino[1,2-b]oxazoline (mp: 125° to 127° C., max a: 260 nm), 3,3,5-trimethyl-2-(para-nitrostyryl)indolino[1,2-b]oxazoline (mp: 164° to 165° C., max a: 298 nm), 3,3-dimethyl-5-methoxy-2-(para-methoxystyryl)indolino[1,2-b]oxazoline (mp: 111° to 112° C., max a: 268 nm), 3,3-dimethyl-2-(metha-methoxystyryl)indolino[1,2-b]-oxazoline (mp: 102° to 104° C., max a: 253 nm), 3,3-dimethyl-2-(ortho-methylstyryl)indolino[1,2-b]oxazoline (mp: 79° to 80° C., max a: 244 nm) and 3,3-dimethyl-2-(ortho-chlorostyryl)indolino[1,2-b]oxazoline (mp: 84° to 85° C., max a: 244 nm).

In addition, in accordance with the method of example 1 or 2, the following compounds were prepared by the reaction of one of 2,3,3-trimethylindolino[1,2-b]-1,3-tetrahydroxazine derivatives and one of aromatic aldehydes.

3,3-dimethyl-2-(para-dimethylaminostyryl)indolino[1,2-b]-1,3-tetrahydroxazine (mp: 132° to 134° C., max a: 299 nm) and 3,3-dimethyl-5-chloro-2-(para-methoxystyryl)indolino[1,2-b]-1,3-tetrahydroxazine (mp: 143° C., max a: 233 nm).

Next, the following compounds were prepared by the reaction of one of cinnamaldehydes and one of indoline derivatives:

3,3-dimethyl-5-methoxy-2-(para-dimethylaminocinnamilidenevinyl)indolino[1,2-b]oxazoline (mp: 135° C., max a: 326 to 328 nm), 3,3-dimethyl-2-(para-dimethylaminocinnamilidenevinyl)indolino[1,2-b]oxazoline (mp: 166° C., max a: 328 to 332 nm), 3,3-dimethyl-5-chloro-2-(para-dimethylaminocinnamilidenevinyl)indolino[1,2-b]oxazoline (mp: 179° C., max a: 338 to 340 nm), 3,3-dimethyl-2-(para-diethylaminocinnamilidenevinyl)indolino[1,2-b]oxazoline (max a: 326 to 330 nm), 3,3-dimethyl-2-(para-dimethylaminocinnamilidenevinyl)indolino[1,2-b]-1,3-tetrahydroxazine (max a: 328 to 331 nm), 3,3-dimethyl-5-chloro-2-(para-dimethylaminocinnamilidenevinyl)indolino[1,2-b]-1,3-tetrahydroxazine (max a:337 to 340 nm), In addition, in accordance with the method of Example 1 or 2, the following compounds were prepared by the reaction of one of aromatic aldehydes and one of 2,3,3 trimethyl-indolino[1,2-b] thiazoline:

3,3-dimethyl-5-methoxy-2-(para-dimethylaminostyryl)indolino[1,2-b]thiazoline (mp: 121° to 123° C., max a: 398 to 400 nm (in acetone)), 3,3-dimethyl-5-carboethoxy-2-(3,4-methylene dioxystyryl)indolino[1,2-b]thiazoline (mp: 117° to 119° C., max a: 366 nm), 3,3-dimethyl-5-chloro-2-(para-methylstyryl)indolino[1,2-b]thiazoline (mp: 57° to 59° C., max a:350 to 352 nm), 3,3-dimethyl-5-chloro-2-(para-methoxystyryl)indolino[1,2-b]thiazoline (max a: 352 to 353 nm), 3,3,5-trimethyl-2-(para-acetylaminostyryl)indolino[1,2-b]thiazoline (mp: 123° to 125° C., max a: 356 to 358 nm), 3,3-dimethyl-5-methoxy-2-(3-hydroxy-4-methoxystyryl)indolino[1,2-b]thiazoline (max a: 358 to 378 nm) and 3,3-dimethyl-5-carboethoxy-2-(ortho-cyanostyryl)indolino[1,2-b]thiazoline (mp: 54° to 55° C., max a: 269 to 271 nm).

In addition, the following compounds were prepared by the reaction of one of heterocyclic aldehydes and one of indoline derivatives:

3,3-dimethyl-2-{2-(5-methylfuryl)vinyl}indolino[1,2-b]oxazoline (max a: 277 nm, shol a: 288 to 289 nm), 3,3-dimethyl-5-chloro-2-{2-(thienyl)vinyl}indolino[1,2-b]oxazoline (mp: 107° to 109° C., max a: 247 nm and 284 nm) and 3,3-dimethyl-2-{2-(9-methylcarbazolyl)vinyl}indolino[1,2-b]oxazoline (mp: 77° to 79° C., max a: 242 to 244 nm and 285 nm).

EXAMPLE 10

In accordance with the processing of example 3 or the modification, the following compounds were prepared by the reaction of one of 2,3,3-trimethylindolino[1,2-b]oxazoline, 2,3,3-trimethylindolino[1,2-b]-1,3-tetrahydroxazine or 2,3,3-trimethylindolino[1,2-b]thiazoline derivatives and one of aromatic or heterocyclic aldehydes:

3,3-dimethyl-5-methoxy-2-(para-dimethylaminostyryl)indolino[1,2-b]oxazoline (mp: 132° C., max a: 297 nm), 3,3-dimethyl-7-methoxy-2-(para-dimethylaminostyryl)indolino[1,2-b]oxazoline (mp: 134° C., max a: 294 nm), 3,3-dimethyl-5-nitro-2-(para-methoxystyryl)indolino[1,2-b]oxazoline (mp: 167° C., max a: 264 nm, shol a: 327 nm), 3,3-dimethyl-2-(3,4-dioxymethylenestyryl)indolino[1,2-b]oxazoline (mp: 81° to 82° C., max a: 271 nm, shol a: 293 nm), 3,3-dimethyl-5-methoxy-2-(para-methoxystyryl)indolino[1,2-b]-1,3-tetrahydroxazine (mp. 97° to 99° C., max a: 264 nm), 3,3-dimethyl-2-(metha-methylstyryl)indolino[1,2-b]oxazoline (max a: 246 nm), 3,3-dimethyl-5-chloro-2-(para-ethoxystyryl)indolino[1,2-b]-oxazoline (max a: 264 to 265 nm), 3,3-dimethyl-2-(3,4-dichlorostyryl)indolino[1,2-b]oxazoline (max a: 256 to 258 nm), 3,3-dimethyl-2-{2-(5-chlorobenzothiazolyl)vinyl}-indolino[1,2-b]ozazoline (max a: 235 to 236 nm, shol a: 280 to 281 nm), 3,3-dimethyl-5-chloro-2-{2-(benzoselenazolyl)vinyl}-indolino[1,2-b]oxazoline (max a: 244 to 245 nm, shol a: 295 to 296 nm), 3,3-dimethyl-2-{2-(furyl)-1,3-butadienilidene}-indolino[1,2-b]oxazoline (max a: 285 to 287 nm), 3,3,5-trimethyl-2-(para-dimethylaminostyryl)indolino[1,2-b]thiazoline (mp: 96° to 98° C., max a: 385 to 386 nm), 3,3,5-trimethyl-2-(para-chlorostyryl)indolino[1,2-b]-thiazoline (mp: 68° to B 69° C., max a: 346 nm, shol a: 358 nm), 3,3,5-trimethyl-2-{2-(thienyl)vinyl}indolino[1,2-b]thiazoline (max a: 359 to 360 nm) and 3,3-dimethyl-5-methoxy-2-{2-(9-ethylcarbazolyl)-vinyl}-indolino[1,2-b]thiazoline (mp: 104° to 106° C., max a: 381 nm, shol a: 364 to 366 nm).

EXAMPLE 11

The following compounds were prepared by the reaction of one of 2,3,3-trimethylindolino [1,2-b]oxazoline derivatives and one of aromatic aldehydes in accordance with the processing of example 4 of the modification:

3,3-dimethyl-5-iodo-2-(para-dimethylaminostyryl)indolino[1,2-b]oxazoline (mp: 169° C., max a: 294 nm), 3,3-dimethyl-5-chloro-2-(para-nitrostyryl)indolino[1,2-b]oxazoline (mp: 132° to 133° C., max a: 297 nm), 3,3-dimethyl-5-nitro-2-(para-nitrostyryl)indolino[1,2-b]oxazoline (mp: 217° C., max a: 308 nm), 3,3-dimethyl-2-styrylindolino [1,2-b]oxazoline and 3,3-dimethyl-5-chloro-2-(3,4-dimethoxystyryl)indolino[1,2-b]oxazoline (max a: 266 nm).

EXAMPLE 12

The following compounds were prepared by the reaction of one of 2,3,3-trimethylindolino [1,2-b]ozazoline or 2,3,3-trimethylindolino[1,2-b]thiazoline derivatives and one of aromatic aldehydes in accordance with the method of example 5 or the similar processing:

3,3,5-trimethyl-2-(para-methoxystyryl)indolino[1,2-b]oxazoline (mp: 127° to 128° C., max a: 264 nm), 3,3-dimethyl-2-(para-dimethylaminostyryl)indolino[1,2-b]thiazoline (mp: 116° to 117° C., max a: 400 nm), 3,3-dimethyl-5-carbo ethoxy-2-(para-dimethylaminostyryl)indolino[1,2-b]thiazoline (mp: 101° to 103° C., max a: 403 nm) and 3,3-dimethyl-2-(para-dibutylaminostyryl)indolino[1,2-b]oxazoline (mp: 72° to 73° C., max a: 300 to 302 nm).

The following compounds were prepared by the reaction of one of aromatic nitroso compounds and one of indoline derivatives:

3,3-dimethyl-2-(para-dimethylamino-2-azastyryl)indolino[1,2-b]oxazoline (mp: 72° to 75° C., max a: 290 to 292 nm) and 3,3-dimethyl-5-chloro-2-(para-dimethylamino-2-azastyryl)indolino[1,2-b]oxazoline (mp: 140° C., max a: 303 to 304 nm).

EXAMPLE 13

The following compounds were prepared by the reaction of one of 2,3,3-trimethylindolino[1,2-b]oxazoline or 2,3,3-trimethylindolino[1,2-b]-1,3-tetrahydroxazine derivatives and one of aromatic or heterocyclic aldehydes in accordance with the processing of example 6 or the modification:

3,3-dimethyl-5-methoxy-2-(para-chlorostyryl)indolino[1,2-b]oxazoline (mp: 118° C., max a: 258 nm), 3,3-dimethyl-5-chloro-2-(para-dimethylaminostyryl)indolino[1,2-b]-1,3-tetrahydroxazine (mp: 153° to 154° C., max a: 306 nm), 3,3-dimethyl-4,5-benzo-2-(para-dimethylaminostyryl)indolino[1,2-b]-1,3-tetrahydroxazine (mp: 96° to 97° C. max a: 304 nm) and 3,3-dimethyl-5-methoxy-2-{2-(4-methylthiazolyl)-vinyl}indolino[1,2-b]oxazoline (max a: 238 to 239 nm, shol a: 296 to 298 nm).

EXAMPLE 14

The following compounds were prepared by the reaction of one of 2,3,3-trimethylindolino[1,2-b]oxazoline, 2,3,3-trimethylindolino[1,2-b]-1,3-tetrahydroxazine or 2,3,3-trimethylindolino[1,2-b]thiazoline derivatives and one of aromatic aldehydes, aromatic nitroso compounds and heterocyclic aldehydes in accordance with the method of example 7 or the modified processing:

3,3-dimethyl-5-nitro-2-(para-dimethylaminostyryl)indolino[1,2-b]oxazoline (mp: 193° C., max a: 302 nm, shol a: 325 nm), 3,3-dimethyl-5-metoxy-2-(para-nitrostyryl)indolino[1,2-b]oxazoline (mp: 172° to 173° C., max a: 301 nm), 3,3-dimethyl-2-(2,4-dimetoxystyryl)indolino[1,2-b]oxazoline (max a: 265 to 267 nm), 3,3-dimethyl-2-(metha-nitrostyryl)indolino[1,2-b]oxazoline (mp: 122° to 123° C., max a: 244 nm), 3,3-dimethyl-2-(3-pyridylvinyl)indolino[1,2-b]oxazoline (max a: 243 to 244 nm, shol a: 284 to 286 nm), 3,3-dimethyl-2-(1-ethyl-3-indolylvinyl)indolino[1,2-b]oxazoline (max a: 234 to 235 nm, shol a: 263 to 264 nm, 287 to 288 nm), 3,3-dimethyl-2-(3,3-dimethyl-2-indolylvinyl)indolino[1,2-b]oxazoline (max a: 237 to 238 nm, shol a: 284 to 285 nm), 3,3-dimethyl-2-{2-(9-ethyl-7-bromocarbazolyl)-vinyl}indolino[1,2-b]oxazoline (mp: 88° to 89° C., max a: 289 nm, shol a: 299 nm), 3,3-dimethyl-5-chloro-2-{2-(benzothiazolyl)vinyl}indolino[1,2-b]thiazoline (mp: 131° to 132° C., max a: 259 to 260 nm), 3,3-dimethyl-5-chloro-2-(para-chlorostyryl)indolino[1,2-b]-1,3-tetrahydroxazine (mp: 155° C., max a: 259 nm), 3,3-dimethyl-2-(para-chlorostyryl)indolino[1,2-b]-1,3-tetrahydroxazine (max a: 261 nm), 3,3-dimethyl-5-methoxy-2-(para-dimethylamino-2-azastyryl)indolino[1,2-b]oxazoline (mp: 56° to 58° C., max a: 271 to 273 nm), 3,3-dimethyl-5-chloro-2-(para-dimethylamino-2-azastyryl)indolino[1,2-b]-1,3-tetrahydroxazine (max a: 302 to 303 nm), 3-methyl-3-ethoxymethyl-2-(para-dimethylaminostyryl)-indolino[1,2-b]-1,3-tetrahydroxazine (max a: 294 to 296 nm) and 3-methyl-3-phenoxyethyl-2-(para-dimethylaminostyryl)indolino[1,2-b]oxazoline (max a: 296 nm).

EXAMPLE 15

The following compounds were prepared, in accordance with the processing of example 8 or the modification, by the reaction of one of 2,3,3-trimethylindolino[1,2-b]oxazoline or 2,3,3-trimethylindolino[1,2-b]-1,3-tetrahydroxazine derivatives and one of aromatic or heterocyclic aldehydes:

3,3-dimethyl-5-methoxy-2-(para-dimethylaminostyryl)indolino[1,2-b]-1,3-tetrahydroxazine (mp: 115° to 116° C., max a: 300 nm), 3,3-dimethyl-2-(para-diethylaminostyryl)indolino[1,2-b]oxazoline (max a: 302 nm), 3,3-dimethyl-2-{2-(5,6-dimethylbenzothiazolyl)-vinyl}indolino[1,2-b]oxazoline (max a: 237 to 238 nm, shol a: 283 to 284 nm), 3,3-dimethyl-2-{8-(2,4-diphenyl-6-methyl-5,6,7-pentahydrobenzopyranyl)vinyl}indolino[1,2-b]oxazoline (mp: 96° to 97° C., max a: 260 to 262 nm, shol a: 239 to 242 nm, 340 to 342 nm), 3,3-dimethyl-2-(2-benzothiazolylidene-propylidene)indolino[1,2-b]oxazoline (max a: 282 to 283 nm, shol a: 350 to 352 nm), 3,3-dimethyl-2-{2-(3,3-dimethylindonilidene)-propylidene}indolino[1,2-b]oxazoline (max a: 279 to 280 nm), 3-methyl-3-hydroxyethyl-2-(metha-methoxystyryl)-indolino[1,2-b]oxazoline (max a: 251 to 252 nm), 3,3-dimethyl-2-{2-methyl-(para-dimethylamino)-styryl}indolino[1,2-b]oxazoline (max a: 292 to 293 nm), 3,3-dimethyl-5-chloro-2-(para-dimethylaminostyryl)indolino[1,2-b]-5-methyloxazoline (max a: 298 to 300 nm) and 3,3-dimethyl-2-(para-chlorostyryl)indolino[1,2-b]-4-methyloxazoline (max a: 258 to 260 nm).

EXAMPLE 16

3,3-dimethyl-2-(para-dimethylaminostyryl)indolino[1,2-b]oxazoline

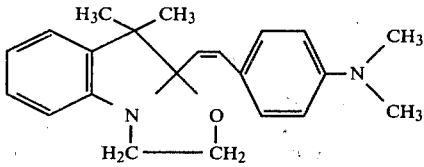

was prepared in the following way:

In 30 ml of absolute ethanol, 1.4 g of 1-hydroxyethyl-2,3,3-trimethyl-indoleniumbromide and 0.7 g of para-dimethylaminobenzaldehyde were refluxed with heating for 3.5 hrs, and then ethanol was eliminated by evaporation. After cooling with ice and washing with ethylether, the resultant residue was filtered off as a crude crystal which was 1-hydroxyethyl-3,3-dimethyl-2-(para-dimethylaminostyryl)-indoleniumbromide. The crude crystal was dissolved into 30 ml of methanol followed by addition of 5 ml of 57% aqueous hydrogen iodide. After heating for about three minutes, the mixture was cooled with ice. The resultant crystal was filtered off and washed well with water, and then washed with an organic solvent such as mixture of ethylether and acetone. The resultant crude crystal was recrystallized with alcohol to obtain 1.5 g of known 1-hydroxyethyl-3,3-dimethyl-2-(para-dimethylaminostyryl)-indoleniumiodide of a bright purplish blue needles in a 78% yield. Structural formula was:

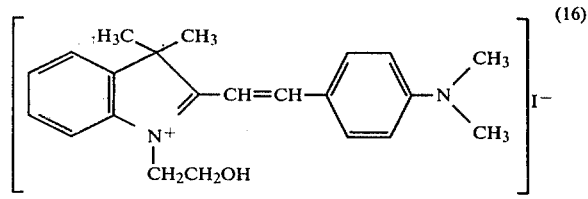

Melting point: 222°–223° C.
Maximum absorption: (in $H_2O$) 550 nm
Maximum absorption: (in Methanol) 547 nm
Maximum absorption: (in Dichloroethane) 564 nm.

In 15 ml of methanol, 0.5 g of 1-hydroxyethyl-3,3-dimethyl-2-(para-dimethylaminostyryl)indoleniumiodide (mp: 222° to 223° C., max a (in water): 550 nm, bright purple or indigo blue needles) was dissolved with heating. The solution was refluxed in 10 ml of 28% ammonia water for 5 to 10 minutes and evaporated to remove the solvent. The residue was mixed with 10 ml of 28% ammonia water, diluted with 100 ml of water, and then cooled with ice. The resultant crystal was taken out by filtration and sufficiently washed with water. The resultant pale yellowish cream-white amorphous crystal with negative halogen reaction was evaporated with heating with 30 ml of ethyl ether and filtered to remove any insoluble parts. The filtrate was evaporated to take off the solvent. By the extraction of the residue with heating with 30 ml of n-hexane, 0.3 g of pale yellowish cream amorphous crystal identical with one of Example 1 was obtained. It melts at 142° C. and exhibits its maximum absorption (in n-hexane) at 296 nm.

EXAMPLE 17

3,3-dimethyl-5-methoxy-2-(para-chlorostyryl)indolino[1,2-b]oxazoline

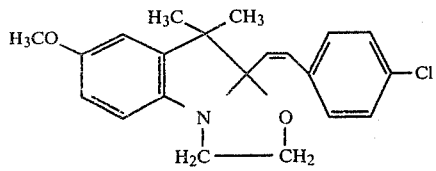
(17)

was prepared in the following way:

In 60 ml of water, 1.2 g of 1-hydroxyethyl-3,3-dimethyl-5-methoxy-2-(para-chlorostyryl)indoleniumiodide (mp: 239° C., max a (in water): 543 nm, red brown purple granular needles) was dissolved with heating. Upon cooled and mixed with 12 ml of 28% ammonia water, the solution became faded and milky turbid. The resulting crystal was separated from the solution by filtration, washed well with water, dried, and then extracted with ethyl ether. The solvent was next eliminated by evaporation and the residue was extracted with heating with cyclohexane. After removing the solvent by evaporation, the residue was washed with petroleum ether with the formation of 0.8 g of the desired product, namely a pale pinkish yellow white amorphous crystal. It melts at 132° to 133° C. and exhibits its maximum absorption (in n-hexane) at 258 nm.

EXAMPLE 18

3,3-dimethyl-5-chloro-2-(para-dimethylaminostyryl)-indolino[1,2-b]thiazoline

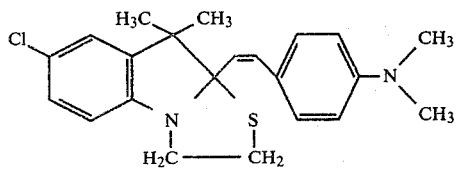
(18)

was prepared in the following way:

One gram of 1-mercaptoethyl-3,3-dimethyl-5-chloro-2-(para-dimethylaminostyryl)indoleniumchloride (mp: 237° to 238° C., max a: 538 to 540 nm, light purple granules) was dissolved with heating in 20 ml of chloroform. The solution was mixed with 1.5 ml of triethylamine and evaporated to remove the solvent. The residue was extracted with heating with n-hexane. The n-hexane-insoluble parts were eliminated from the mixture by filtration. After evaporating the filtrate to take away the solvent, the residue was washed with petroleum ehter with the formation of 0.65 g of the desired product, namely orange yellow granules, which melt at 114° to 115° C. and exhibit their maximum absorption (in n-hexane) at 408 to 410 nm.

EXAMPLE 19

3,3,5-trimethyl-2-(para-chlorostyryl)indolino[1,2-b]oxazoline

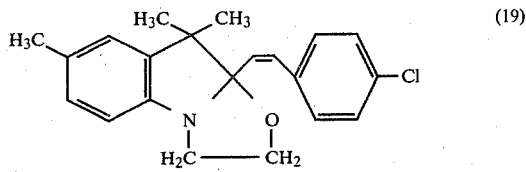
(19)

was prepared in the following way:

One gram of 1-hydroxyethyl-3,3,5-trimethyl-2-(para-chlorostyryl)indoleniumiodide (mp: 225° C., max a (in water): 400 nm, yellowish orange needles) was dissolved by heating in 30 ml of methanol, mixed with 0.6 ml of morpholine, and then boiled for 2 minutes. After evaporating the solution to take away the solvent, the residue was broken in water, filtered to remove the water, treated with methanol-ammonia water, filtered again, dried, and then extracted with ethyl ether. After eliminated the solvent by evaporation, the residue was extracted by heating in n-hexane. The resultant crystal weighed 0.6 g of the desired product, namely cream yellow powdered crystals. The crystals melt at 141° to 142° C. and exhibit their maximum absorption (in n-hexane) at 258 nm.

EXAMPLE 20

3,3-dimethyl-5-chloro-2-(para-methoxystyryl)indolino[1,2-b]-1,3-tetrahydroxyoxazine

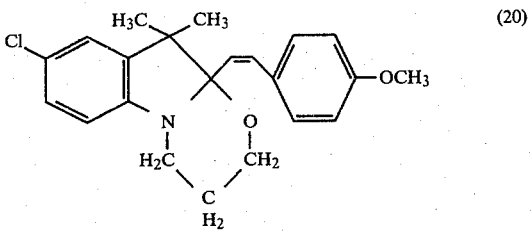
(20)

was prepared in the following way:

One gram of 1-hydroxypropyl-3,3-dimethyl-5-chloro-2-(para-methoxystyryl)indoleniumiodide (mp: 177° to 178° C., max a (in water): 430 nm, orange-red granules) was dissolved in 20 ml of dimethylformamide, heated with 0.5 ml of piperidine for 2 to 3 minutes, cooled, broken with a suitable amount of water, and then filtered. The residue was extracted with ethyl ether, dried by anhydrous magnesium sulfate, and then filtered. The region of ether in the filtrate was treated with active carbon and filtered. The filtrate was evaporated to remove the solvent. The resultant residue was extracted with heating in n-hexane to obtain 0.55 g of the desired product, namely a dark pale pinkish yellowish white amorphous crystal. It melts at 143° C. and exhibits its maximum absorption (in n-hexane) at 263 nm.

EXAMPLE 21

3,3-dimethyl-5-chloro-2-(para-dimethylamino-2-azastyryl)indolino[1,2-b]oxazoline

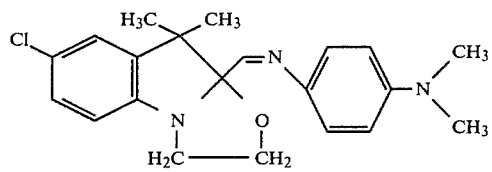

(21)

was prepared in the following way:

In 60 ml of methanol, 1.2 g of 1-hydroxyethyl-3,3-dimethyl-5-chloro-2-(para-dimethylamino-2-azastyryl)indoleniumbromide (max a (in methanol): 601 nm, bright golden or light green scales) was dissolved by heating and treated in ammonia water to separate a creamy crystal. The crystal was filtered out, washed with water and then vacuum dried. The resultant crystal weighed 0.9 g of the desired product, namely a grayish white amorphous crystal, melting at 176° C. Upon treating it with n-hexane, a pale blue-grayish white powder was formed. It melts at 180° C. and exhibits its maximum absorption (in n-hexane) at 303 nm.

EXAMPLE 22

3,3-dimethyl-2-(3,4-dioxymethylenestyryl)indolino[1,2-b]oxazoline

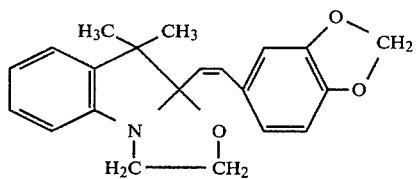

(22)

was prepared in the following way:

One gram of 1-hydroxyethyl-3,3-dimethyl-2-(3,4-dioxymethylenestyryl)indoleniumbromide (mp: 160° to 161° C., max a (in water): 439 nm, shol a: 270 nm, light orange granules) was dissolved in 30 ml of 20% methanol-aqueous, added to 15 ml of 5% potassium carbonate aqueous solution, and then extracted with ethyl ether. The ethyl ether, after drying by anhydrous sodium sulfate, was filtrated. The region of ether in the filtrate was removed by evaporation. The residue was treated with n-hexane to obtain 0.5 g of the desired product, namely a pink-yellowish yellow-white crystal melting at 80° to 81° C. and exhibiting its maximum absorption (in n-hexane) at 271 nm and sholder absorption at 293 nm.

In the abovementioned Examples 16 to 22, disclosure is made on preparing of several typical examples of the products of the formula (1) by the second method, namely, treating a styryl dye of the formula (2) in an alkali. Of course, the compounds prepared by the Examples 1 to 15 can be prepared by the second method exemplified in the Examples 16 to 22.

What is claimed is:

1. A compound of the formula

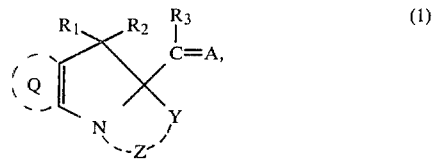

(1)

wherein

Q is aryl;

each of $R_1$ and $R_2$ is lower alkyl, hydroxyl alkyl, or alkoxyalkyl;

$R_3$ is hydrogen, alkyl, alkoxy, halogen, cyano, aryl, or phenoxy;

Y is oxygen or sulfur;

Z is alkylene of 2 to 4 carbon atoms unsubstituted or substituted by alkyl;

A is a condensation reaction residue of a compound selected from the group consisting of an aryl aldehyde, a nitroso aryl, a heterocyclic aldehyde compound, and a nitroso indole, said aryl aldehyde and said nitroso aryl being free of a hydroxy or a derivative of hydroxy ortho to the carbon atom bonded to said C= and said heterocyclic moiety being selected from the group consisting of indole, furan, thiophene, pyridine, carbazole, pyrrole, benzothiazole, benzoselenazole, thiazole, benzopyran quinoline, acridine, and pyrimidine, wherein said heterocyclic moiety is unsubstituted or substituted by alkyl, alkylidene, aryl, or halogen.

2. A dye of claim 1, wherein the aromatic nitroso compound is selected from the group consisting of p-dimethylaminonitrosobenzene; p-diethylaminonitrosobenzene, p-methylnitrosobenzene(p-nitrosotoluen), p-nitro-nitrosobenzene, o-nitronitrosobenzene and 3-nitroso-2-nitrotoluene.

3. A dye of claim 1, wherein the aldehyde of a heterocyclic compound is selected from the group consisting of furfural, 5-methylfurfural, 5-bromo-furfural, 4-isopropylfurfural, 2-thiophene-carboxaldehyde, 5-methylthiophene-carboxaldehyde, 3-methoxybenzothiophene-2-carboxaldehyde, 2-pyridinecarboxaldehyde, 3-pyridinecarboxaldehyde, 4-pyridinecarboxaldehyde, 1-ethylindole-3-carboxaldehyde, 1-methylindole-3-carboxaldehyde, 1-methyl-2-phenylindole-3-carboxaldehyde, N-methyl-carbazole-2-carboxaldehyde, N-ethyl-7-bromo-carbazole-2-carboxaldehyde, N-(n-octyl)-7-nitrocarbazole-2-carboxaldehyde, benzofuran-2-carboxaldehyde, dibenzofuran-2-carboxaldehyde, pyrrole-2-aldehyde, N-methylpyrrole-2-aldehyde, N-phenylpyrrole-2-aldehyde, 3-methylpyrrole-2-aldehyde, 2-ethylpyrole-5-aldehyde, benzothiazole-2-aldehyde, 6-methylbenzothiazole-2-aldehyde, 6-chlorobenzothiazole-2-aldehyde, 5-chlorobenzothiazole-2-aldehyde, 6-methoxybenzothiazole-2-aldehyde, 5,6-dichlorobenzothiazole-2-aldehyde, benzoselenazole-2-aldehyde, 6-methoxybenzoselenazole-2-aldehyde, 2,4-dimethylpyrrole-2-aldehyde, 4,6-dichloro-pyrimidine-5-carboxaldehyde, 2-formyl-4,6-dimethylpyrimidine, quinoline-2-aldehyde, acridine-10-aldehyde 2,4-diphenyl-5,6,7-hexahydrobenzopyran-8-carboxaldehyde and 2,4-diphenyl-6-methyl-5,6,7-pentahydrobenzopyran-8-carboxaldehyde.

4. A dye of claim 1, wherein the nitroso indole compound is selected from the group consisting of 3-nitrosoindole, 2-methyl-3-nitrosoindole and 3-nitroso-2-phenylindole.

5. The compound of claim 1, wherein said compound undergoes reversible color change on exposure to light.

6. The compound of claim 1, wherein the aryl of said aryl aldehyde, said nitroso aryl, and Q is a substituted or unsubstituted phenyl.

7. The compound of claim 1, wherein the aryl of Q is unsubstituted phenyl, naphthyl, or phenyl substituted by at least one selected from the group consisting of acetyl, chloro, methyl, methoxy, carboethoxy, nitro and iodo.

8. The compound of claim 1, wherein the aryl of said aryl aldehyde and of said nitroso aryl is unsubstituted phenyl or phenyl substituted by at least one selected from the group consisting of dimethyl amino; chloro; nitro; bromo; methoxy; acetyl; meta-hydroxy; para-hydroxy; methyl, 3,4-dioxy methylene; cyano and acetylamino.

9. A compound according to claim 1 where $R_3$ is hydrogen.

10. A compound according to claim 1 where A is a condensation reaction residue of a compound selected from the group consisting of an aryl aldehyde, a nitroso aryl, an aldehyde of a compound selected from the group consisting of unsubstituted or substituted indole, furyl, thiophene, pyridine, carbazole, pyrrole, 2-benzothiazole, 2-benzoselenazole, 2-thiazole, 8-benzopyrane, quinoline, acridine and 2-pyrimidine, and a nitroso indole, said aryl aldehyde and said nitroso aryl being free of a hydroxy or a derivative of hydroxy ortho to the carbon atom of said compound bonded to said C═.

11. The compound of claim 10, wherein the aryl of Q is unsubstituted phenyl, naphthyl, or phenyl substituted by at least one selected from the group consisting of acetyl, chloro, methyl, methoxy, carboethoxy, nitro and iodo.

12. The compound of claim 10, wherein the aryl of said aryl aldehyde and of said nitroso aryl is unsubstituted phenyl or phenyl substituted by at least one selected from the group consisting of dimethyl amino; chloro; nitro; bromo; methoxy; acetyl; meta-hydroxy; para-hydroxy; methyl, 3,4-dioxy methylene; cyano and acetylamino.

13. The compound of claim 12, wherein the aryl of Q is unsubstituted phenyl, naphthyl, or phenyl substituted by at least one selected from the group consisting of acetyl, chloro, methyl, methoxy, carboethoxy, nitro and iodo.

14. The compound of claim 10, wherein the aryl of Q is unsubstituted phenyl, naphthyl or phenyl substituted by at least one selected from the group consisting of halogen, alkyl, alkoxy, carboalkoxy, amino, acylamino, aryroylamino, dialkylamino, alkylamino, aryloxy, carboxy, cyano and aryl.

15. The compound of claim 10, wherein the aryl of said aryl aldehyde and said nitroso aryl is unsubstituted phenyl or phenyl substituted by dialkylamino; halogen; alkoxy; alkyl; 3,4-dioxy alkylene or mixtures thereof.

16. The compound of claim 10, wherein the aryl of Q is unsubstituted phenyl, naphthyl, or phenyl substituted by at least one selected from the group consisting of acetyl, chloro, acetamino, methyl, methoxy, carboethoxy, nitro, diethylamino, dimethylamino and iodo.

17. The compound of claim 10, wherein the aryl of said aryl aldehyde and of said nitroso aryl is unsubstituted phenyl or phenyl substituted by a member selected from the group consisting of dimethylamino, dibutylamino, chloro, nitro, methoxy, bromo, meta-hydroxy, 3,4-dioxymethylene, acetamino and cyano.

18. The compound of claim 10 which is 3,3-dimethyl-2-{2-(5-chloro benzothiazolyl)vinyl}indolino[1,2-b]oxazoline.

19. The compound of claim 10, which is 3,3-dimethyl-2-{2-(9-ethyl-7-bromo-carbazolyl)vinyl}indolino[1,2-b]oxazoline.

20. The compound of claim 10, which is 3,3-dimethyl-5-chloro-2-(1-ethyl-3-indolyl vinyl)indolino-[1,2-b]oxazoline.

21. The compound of claim 10, which is 3,3-dimethyl-5-acetylamino-2-(3-pyridyl vinyl)indolino[1,2-b]oxazoline.

22. The compound of claim 10, which is 3-methyl-3-ethoxy ethyl-5-carboxy ethyl-2-(p-diethylamino-2-azastyryl)indolino[2,1-b]oxazoline.

23. The compound of claim 10, which is 3,3-dimethyl-5-methoxy-2-(p-dimethylamino styryl)indolino[1,2-b]-1,3-tetrahydro oxazine.

24. The compound of claim 10, which is 3,3-dimethyl-2-(p-chloro styryl)indolino[1,2-b]-4-methyl oxazoline.

25. The compound of claim 10, which is 3,3-dimethyl-2-(p-dimethylamino-2-methyl styryl)indolino[1,2-b]oxazoline.

26. A compound of the formula

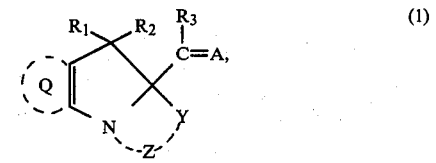

wherein:
Q is aryl;
each of $R_1$ and $R_2$ is lower alkyl, hydroxy alkyl or alkoxyalkyl;
$R_3$ is hydrogen, alkyl, alkoxy, halogen, cyano, aryl or phenoxy;
Y is oxygen or sulfur;
Z is alkylene of 2 to 4 carbon atoms unsubstituted or substituted by alkyl;
A is a condensation reaction residue of a compound selected from the group consisting of an aryl aldehyde, a nitroso aryl, an indole aldehyde and a nitroso indole,
said aryl aldehyde and said nitroso aryl being free of a hydroxy or a derivative of hydroxy ortho to the carbon atom of said compound bonded to said C═.

27. The compound of claim 26 which is 3,3-dimethyl-2-(para-dimethylaminostyryl)indolino-[1,2-b]oxazoline.

28. The compound of claim 26 which is 3,3-dimethyl-5-methoxy-2-(para-chlorostyryl) indolino-[1,2-b]oxazoline.

29. The compound of claim 26 which is 3,3-dimethyl-5-chloro-2-(para-dimethylaminostyryl) indolino-[1,2-b]thiazoline.

30. The compound of claim 26 which is 3,3-dimethyl-5-chloro-2-(para-methoxystyryl) indolino-[1,2-b]-1,3-tetrahydroxyoxazine.

31. The compound of claim 26 which is 3,3-dimethyl-5-chloro-2-(para-dimethylamino-2-azastyryl) indolino-[1,2-b]oxazoline.

32. The compound of claim 26 which is 3,3-dimethyl-2-(3,4-dioxymethylene styryl) indolino-[1,2-b]oxazoline.

33. The compound of claim 24, wherein said compound undergoes reversible color change on exposure to light.

34. The compound of claim 26, wherein the aryl of said aryl aldehyde, said nitroso aryl, and Q is a substituted or unsubstituted phenyl.

35. The compound of claim 26, wherein the aryl of Q is unsubstituted phenyl, napthyl, or phenyl substituted by at least one selected from the group consisting of acetyl, chloro, methyl, methoxy, carboethoxy, nitro, iodo and hydroxyethyl.

36. The compound of claim 26, wherein the aryl of said aryl aldehyde and of said nitroso aryl is unsubstituted phenyl or phenyl substituted by at least one selected from the group consisting of dimethyl amino; chloro; nitro; bromo; methoxy; acetyl; hydroxy; methyl, 3,4-dioxy methylene; and acetylamino.

37. The compound of claim 36 wherein the aryl of Q is unsubstituted phenyl naphthyl, or phenyl substituted by at least one selected from the group consisting of acetyl, chloro, methyl, methoxy, carboethoxy, nitro, iodo and hydroxyethyl.

38. The compound of claim 26, wherein the aryl of Q is unsubstituted phenyl, naphthyl or phenyl substituted by at least one selected from the group consisting of keto, halogen, alkyl, alkoxy, carboalkoxy, nitro and hydroxy alkyl.

39. The compound of claim 38, wherein the aryl of said aryl aldehyde and said nitroso aryl is unsubstituted phenyl or phenyl substituted by dialkylamino; halogen; nitro; alkoxy; keto; hydroxy; alkyl; 3,4-dioxy alkylene, ketoamino, or mixtures thereof.

40. A compound according to claim 26 where $R_3$ is hydrogen.

* * * * *